Nov. 5, 1940.  C. D. PETERSON  2,220,543

SELECTING AND SHIFTING MECHANISM FOR TRANSMISSION GEARING

Original Filed April 28, 1937

INVENTOR.
Carl D. Peterson
BY Bodell & Thompson
ATTORNEYS.

Patented Nov. 5, 1940

2,220,543

UNITED STATES PATENT OFFICE 2,220,543

SELECTING AND SHIFTING MECHANISM FOR TRANSMISSION GEARING

Carl D. Peterson, Toledo, Ohio

Original application April 28, 1937, Serial No. 139,520. Divided and this application January 30, 1940, Serial No. 316,382

3 Claims. (Cl. 74—333)

This invention relates to transmission gearing, such as shown in my application, Serial No. 139,520, filed April 28, 1937, of which application this is a division.

It has for its object a gear shifting mechanism in which there are no shift rods or supports for the shifter blocks of the selecting and shifting mechanism, but in which a stationary rod forming a support for a gear of one of the gear trains, as the reverse train, is utilized as a guide or support for all the shifter blocks, whereby the assembly of the selecting and shifting mechanism in the gear box is especially compact, occupies a minimum space, and requires a box of minimum size.

The invention consists in the novel features and in the combinations and constructions hereinafter set forth and claimed.

In describing this invention, reference is had to the accompanying drawing, in which like characters designate corresponding parts in all the views.

Figure 2:
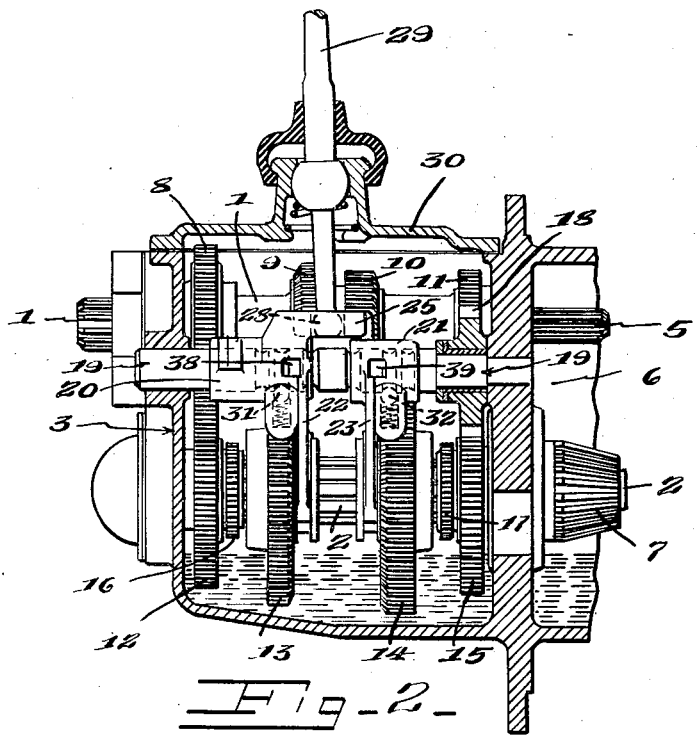
Figure 2 is a sectional view on line 2—2, Figure 1.
Figure 1:
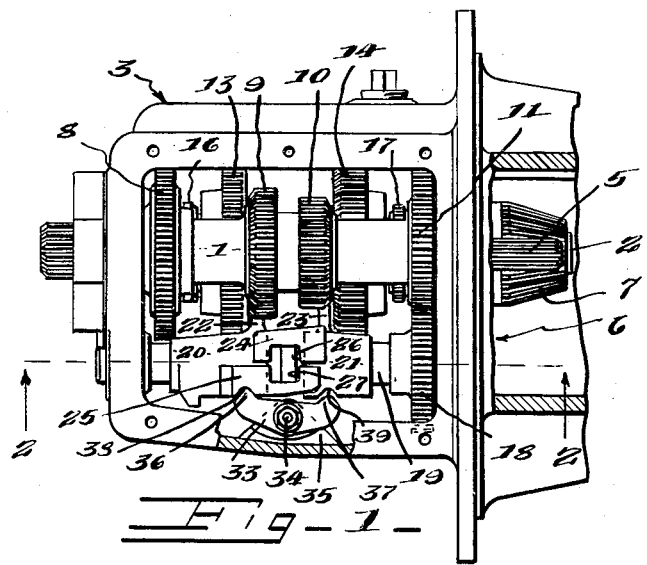
Figure 1 is a plan view of a transmission mechanism embodying this invention, partly in section, with the cover of the gear box removed and also the contiguous portion of the additional gear box being also shown.

In the gearing here shown, 1 designates the input shaft and 2 the output shaft, these being here shown as mounted in the end walls of a gear box 3 parallel to each other with the input shaft 1 extending through the front wall of the gear box, where it is connected in any well known manner to the engine of the vehicle through the usual engine clutch. The input shaft 1 also extends at 5 through the rear end wall or partition of a compartment 6 where it may be coupled for power take off purposes. The output shaft 2 extends into the compartment 6 where it is provided with a bevel pinion 7 for meshing with the ring gear of the differential mechanism located in the compartment 6.

8, 9, 10 and 11 are gears mounted on and rotatable with the input shaft 1. 12, 13, 14 and 15 are gears mounted on the output shaft 2. The gears 12 and 15, which are mounted on the output shaft 2 near the end walls of the gear box, are normally rotatable about the output shaft 2 and are clutchable thereto. They mesh respectively with the gear 8 on the input shaft and with an idler gear to be described, which meshes with the gear 11 on the input shaft.

The gears 13 and 14 are slidably splined on the output shaft 2 and are normally out of mesh with the gears 9, 10 on the input shaft. The gear 13 is shiftable in one direction, as to the right from neutral position, into mesh with the gear 9 and to the left from neutral position to engage a clutch face thereon with a clutch face 16 on the gear 12, in order to clutch the gear 12 to the output shaft 2. The gear 14 is shiftable in one direction, as to the left from neutral, into mesh with the gear 10 and to the right from neutral, to engage a clutch face thereon with a clutch face 17 on the gear 15 to clutch this gear 15 to the output shaft to produce reverse speed through the idler.

18 designates the idler meshing with the gears 15 and 11. It is mounted on and rotatable about a non-rotatable rod 19 in the end wall of the gear box parallel to the shafts 1, 2.

The selecting and shifting mechanism for the shiftable members or gears 13 or 14 include shifter blocks 20 and 21 having forks 22 and 23 working in grooves on the hubs of the gears 13 and 14. The blocks are arranged end to end on the rod 19 and have lapping portions 24, 25 formed with notches 26, 27 respectively, which are normally in transverse alinement when the gears 13 and 14 are in neutral position. These notches receive the finger 28 at the lower end of a gear shifting lever 29 mounted in the cover 30 of the gear box to have a lateral selecting movement and a fore and aft shifting movement. The shifter blocks are provided with suitable spring-pressed poppets 31, 32 coacting with suitable notches or grooves in the rod to locate the shifters in neutral and in shifted position, and tending to lock them from unintentional displacement from such position.

Locking means is also provided for positively locking the unshifted block from movement when the other block is shifted from neutral position. The locking means here illustrated consists of a lever 33 pivoted between its ends at 34 to an internal lug 35 in the gear box and having a nose 36 or 37 at each end coacting with cam-shaped notches 38, 39 in the shifter blocks. When the shifter blocks are in neutral position, the nose 36 or 37 may be in either one of the notches, but when one of the blocks is shifted, the nose of the lever coacting with that block is shifted out of its notch and the lever moved on its pivot to move the nose at the other end into its notch. It is held therein and can not work out of the notch until the shifted block has again been restored to neutral position.

Owing to this arrangement, all the shiftable elements of the gearing are mounted upon a fixed rod which primarily forms a support for an intermediate gear of one of the trains of gears of the gearing, so that shift rods are dispensed with and at the same time, no special part provided to perform the function of the shift rods. This results in a particularly compact gearing consisting of a minimum number of compactly arranged parts.

What I claim is:

1. In a change speed gearing, a gear box, driving and driven shafts in the gear box, trains of selectively operable gears between the shafts including a reverse gear train which includes an intermediate idler, a rod fixed in the gear box about which the idler rotates, the gear trains including selectively operable shiftable members, means for selecting and shifting the shiftable members comprising shifter blocks mounted on said rod end to end and each shiftable in opposite direction from neutral, the blocks having lapping portions provided with notches normally alined when said members are in neutral, and a selecting and shifting lever having a finger shiftable into individual engagement with any one of the notches.

2. In a change speed gearing, a gear box, driving and driven shafts in the gear box, trains of selectively operable gears between the shafts including a reverse gear train which includes an intermediate idler, a rod fixed in the gear box about which the idler rotates, the gear trains including selectively operable shiftable members, means for selecting and shifting the shiftable members comprising shifter blocks mounted on said rod end to end and each shiftable in opposite directions from neutral, the blocks having lapping portions provided with notches normally alined when said members are in neutral, and a selecting and shifting lever having a finger shiftable into individual engagement with any one of the notches, and locking means operated by the shifting of any one block from neutral to positively lock the other block from movement.

3. In a change speed gearing, a gear box, a drive shaft mounted in the gear box, a driven shaft mounted in the gear box parallel with the drive shaft, trains of intermeshing gears between the shafts, some of the gears being shiftable axially in opposite directions from neutral, means for selecting and shifting the axially shiftable gears, a rod fixedly mounted in the gear box parallel to said shafts and one of the gear trains including an idler gear mounted on and rotatable about said rod and clutchable thereto by the operation of one of said shiftable members from neutral, the selecting and shifting means including shifter blocks, one for each shiftable member, the blocks being slidably mounted on said rod and each being shiftable along the rod in opposite directions from neutral, the blocks having lapping portions formed with notches alined when the blocks are in neutral position, and a selecting and shifting lever having a finger coacting with said notches.

CARL D. PETERSON.